US012305588B2

(12) United States Patent
Nakamura et al.

(10) Patent No.: US 12,305,588 B2
(45) Date of Patent: May 20, 2025

(54) VEHICLE CONTROL APPARATUS

(71) Applicant: SUBARU CORPORATION, Tokyo (JP)

(72) Inventors: Yusuke Nakamura, Tokyo (JP); Ryosuke Goto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/709,956

(22) PCT Filed: Sep. 29, 2022

(86) PCT No.: PCT/JP2022/036442
§ 371 (c)(1),
(2) Date: May 14, 2024

(87) PCT Pub. No.: WO2024/069852
PCT Pub. Date: Apr. 4, 2024

(65) Prior Publication Data

US 2025/0012229 A1 Jan. 9, 2025

(51) Int. Cl.
*F02D 41/26* (2006.01)

(52) U.S. Cl.
CPC .......... *F02D 41/26* (2013.01); *F02D 2200/04* (2013.01)

(58) Field of Classification Search
CPC ............................ F02D 2200/04; F02D 41/26
See application file for complete search history.

(56) References Cited

U.S. PATENT DOCUMENTS

| | | | | |
|---|---|---|---|---|
| 5,080,073 | A | 1/1992 | Fujihara et al. | |
| 5,572,976 | A | 11/1996 | Minamitan et al. | |
| 2006/0224298 | A1* | 10/2006 | Lang | G01F 1/72 701/115 |
| 2007/0162243 | A1 | 7/2007 | Gelmetti et al. | |
| 2010/0031731 | A1 | 2/2010 | Kawase et al. | |
| 2010/0154509 | A1 | 6/2010 | Asano et al. | |
| 2015/0040652 | A1 | 2/2015 | Wakao et al. | |

FOREIGN PATENT DOCUMENTS

| | | | |
|---|---|---|---|
| JP | H02-241948 | A | 9/1990 |
| JP | H03-213639 | A | 9/1991 |
| JP | H05-321731 | A | 12/1993 |

(Continued)

OTHER PUBLICATIONS

International Search Report issued in the International Application No. PCT/JP2022/036442 on Dec. 20, 2022, w/English Translation.

*Primary Examiner* — Kevin A Lathers
(74) *Attorney, Agent, or Firm* — Rimon P.C.

(57) ABSTRACT

A vehicle control apparatus includes an air flow sensor provided in an intake passage of an engine. The vehicle control apparatus includes a control system configured to read an output signal from the air flow sensor as first flow rate data. The control system is configured to calculate a coefficient of variation of the first flow rate data, and subject the first flow rate data to a smoothing process to calculate second flow rate data. The control system is configured to correct the second flow rate data based on the coefficient of variation, to calculate corrected flow rate data indicating the intake air flow rate in the intake passage.

4 Claims, 9 Drawing Sheets

(56) References Cited

FOREIGN PATENT DOCUMENTS

| | | | |
|---|---|---|---|
| JP | H07-247895 | A | 9/1995 |
| JP | H10-220306 | A | 8/1998 |
| JP | 2001-123879 | A | 5/2001 |
| JP | 2007-182843 | A | 7/2007 |
| JP | 2010-38794 | A | 2/2010 |
| JP | 2018-123768 | A | 8/2018 |
| WO | 2013/103018 | A1 | 7/2013 |

* cited by examiner

[FIG. 1]
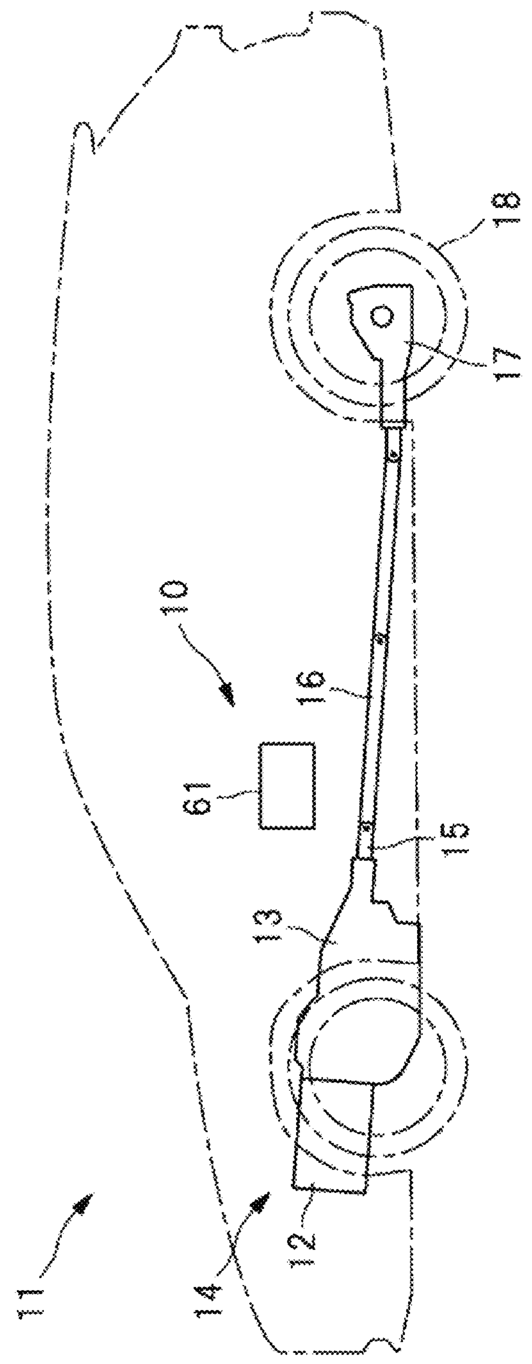

[FIG. 2]
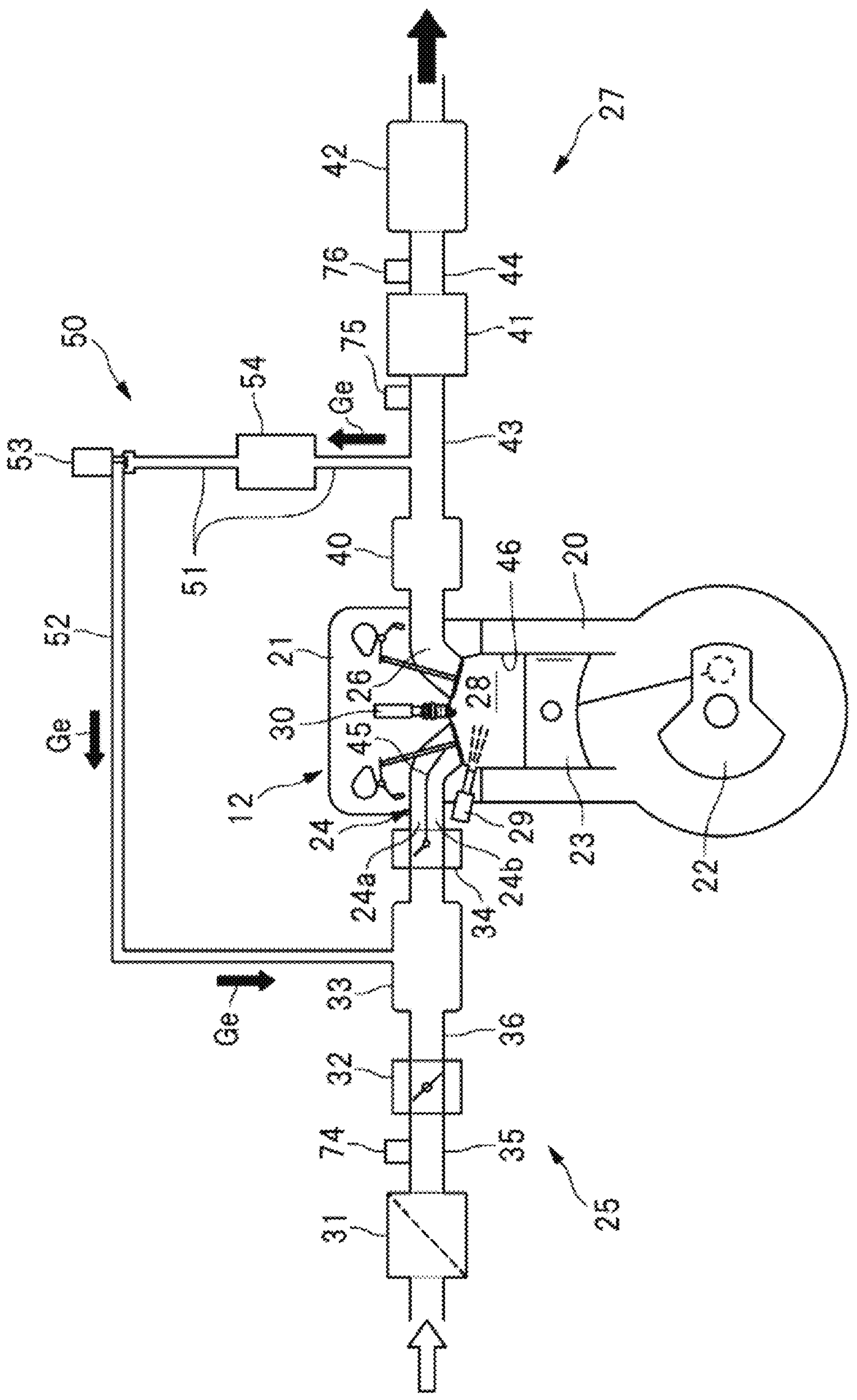

[FIG. 3]
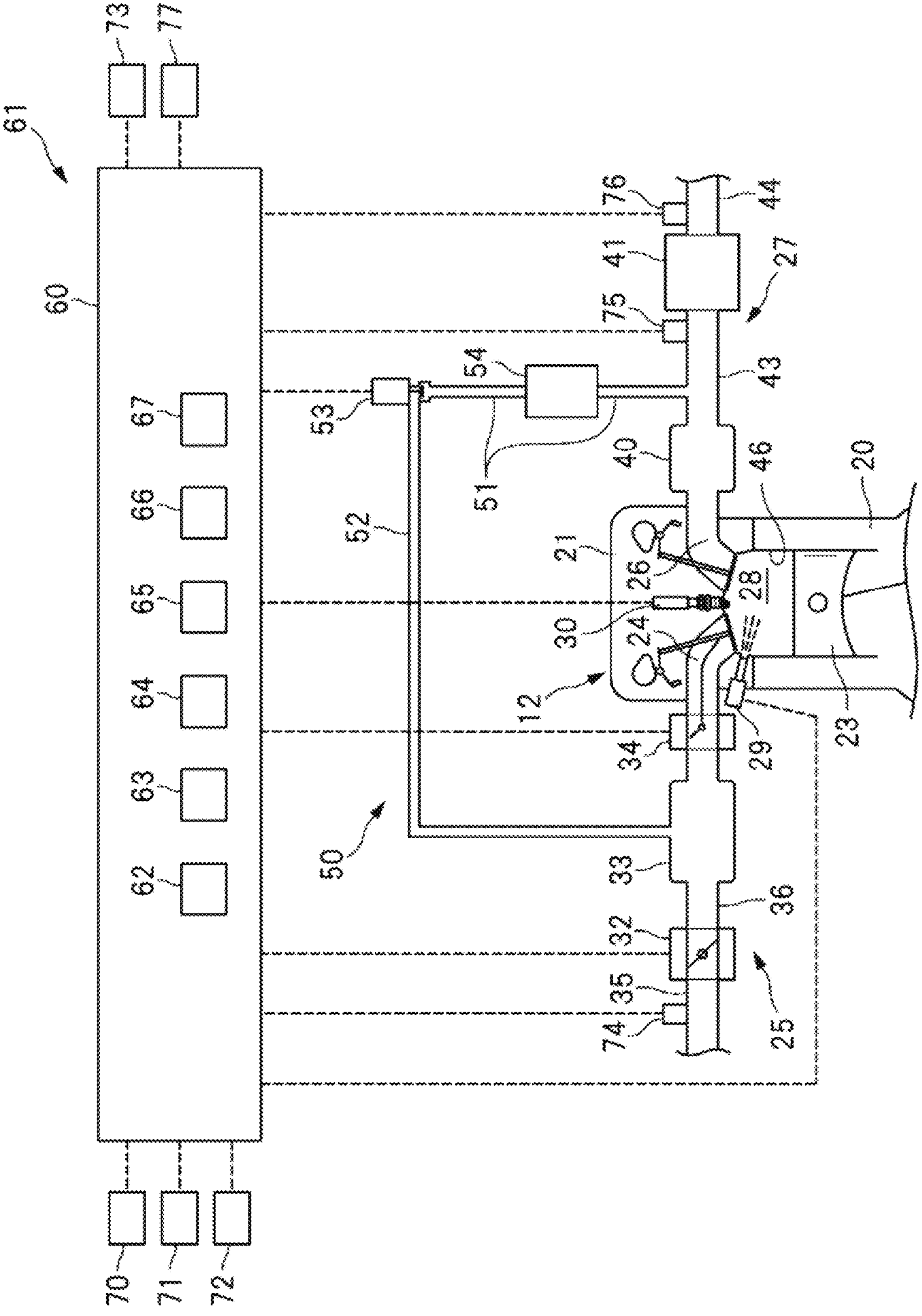

[FIG. 4]
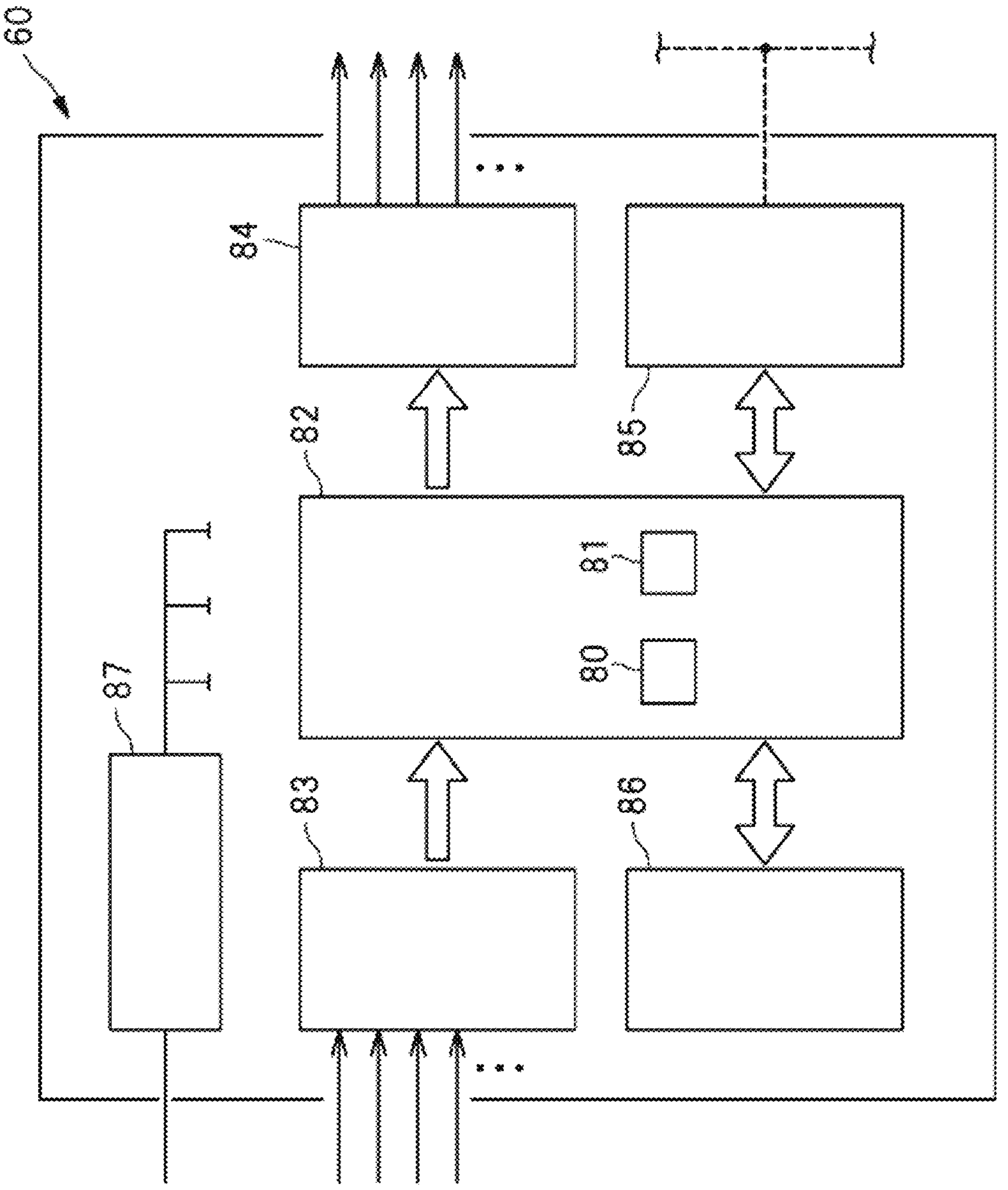

[ FIG. 5 ]
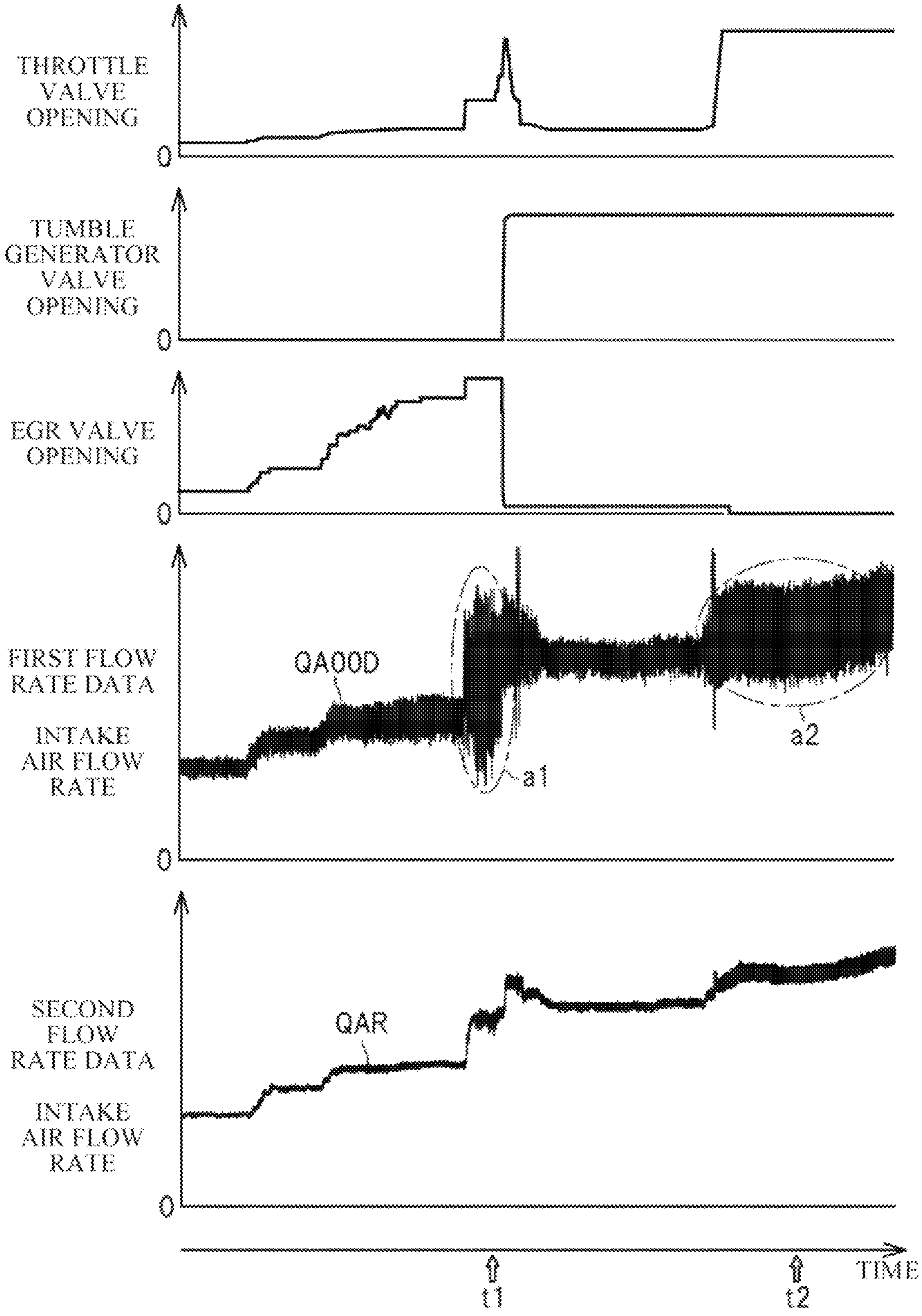

[FIG. 6]
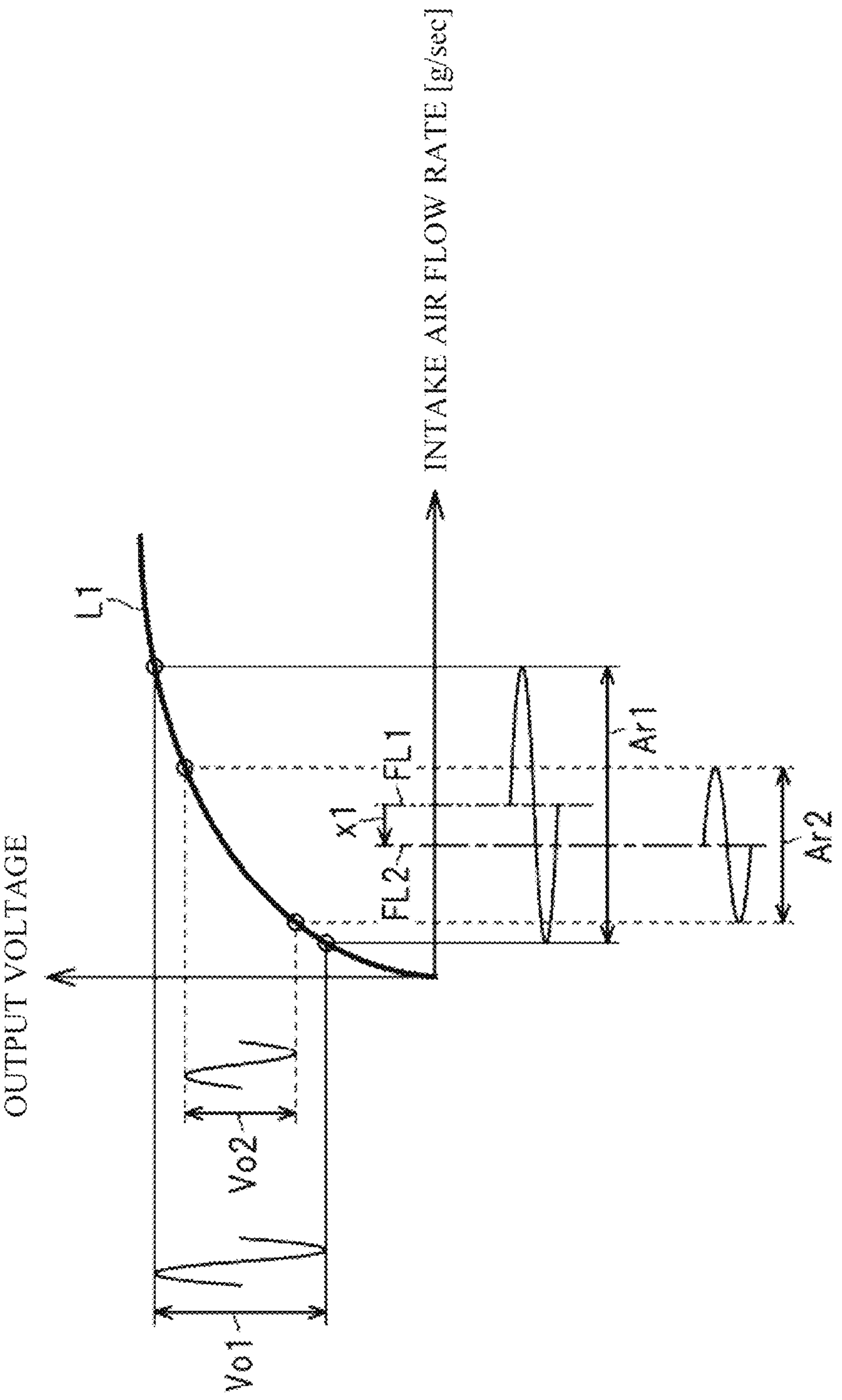

[FIG. 7]
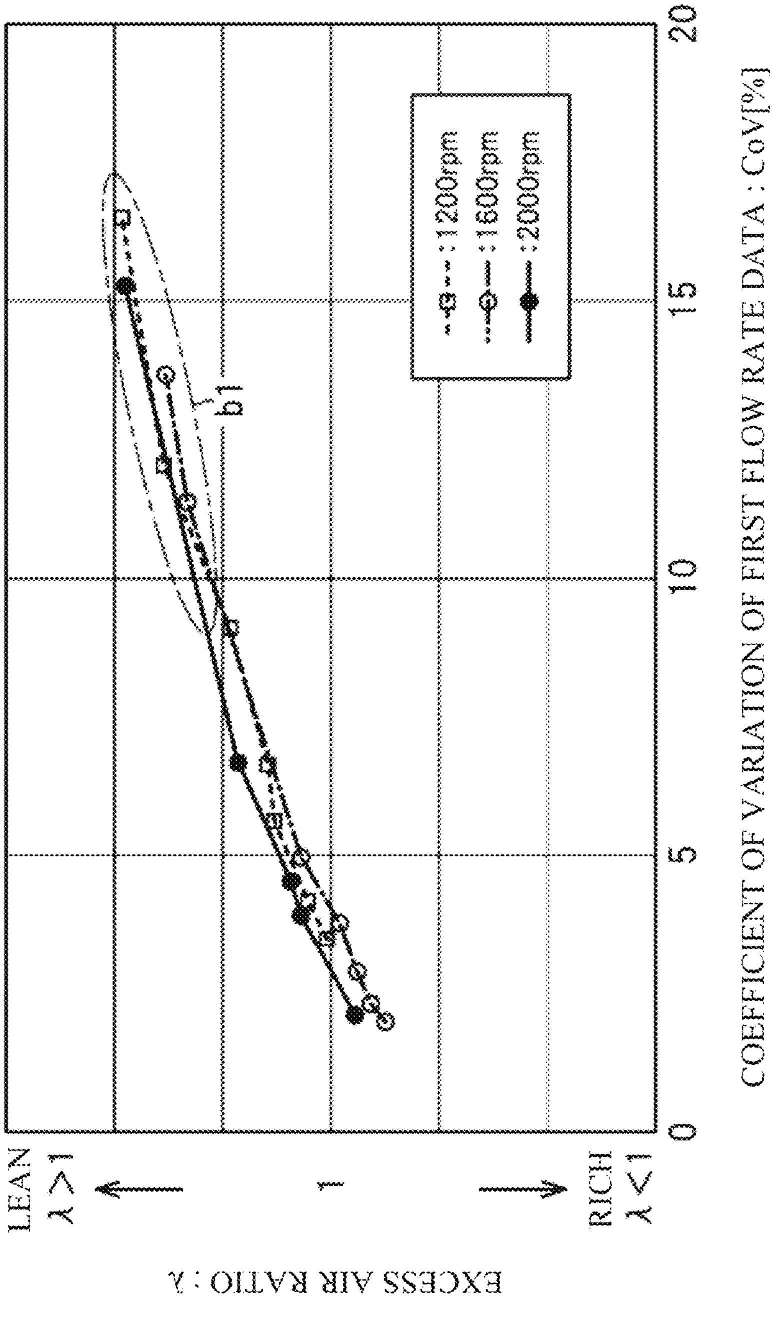

[ FIG. 8 ]
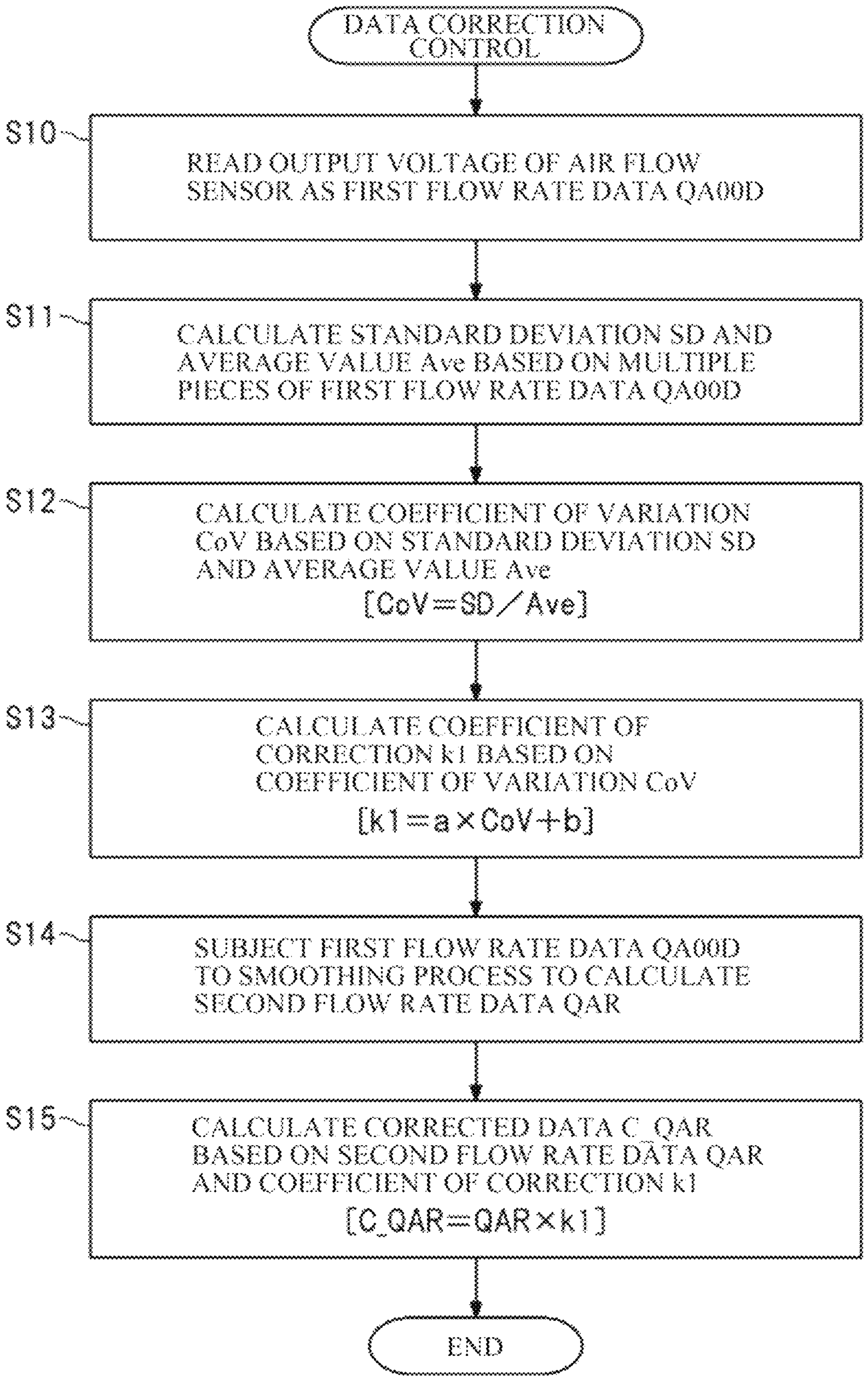

[FIG. 9]
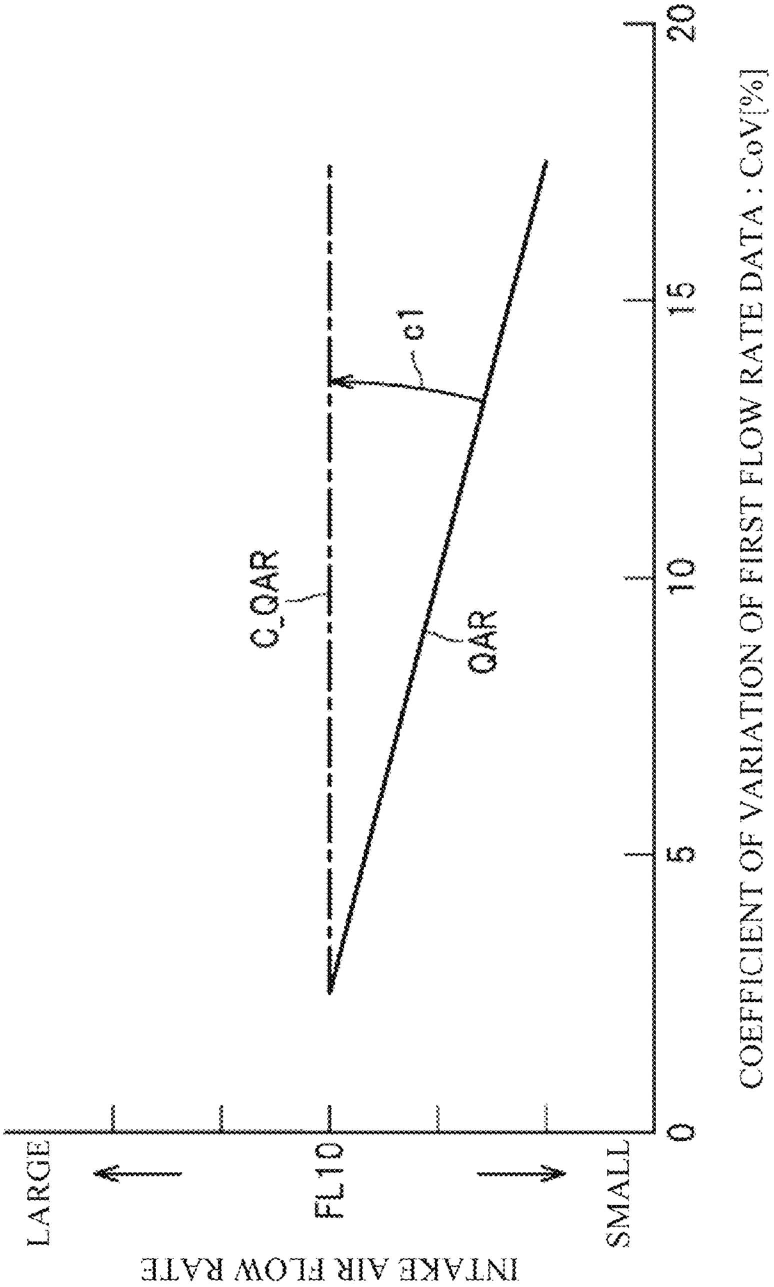

VEHICLE CONTROL APPARATUS

CROSS-REFERENCE TO RELATED APPLICATIONS

This application is the U.S. National Phase under 35 U.S.C. § 371 of International Application No. PCT/JP2022/036442, filed on Sep. 29, 2022.

TECHNICAL FIELD

The invention relates to a vehicle control apparatus to be provided in a vehicle.

BACKGROUND ART

A vehicle including an engine as an internal combustion engine is provided with an air flow sensor such as a heat wire air flow sensor or a Karman vortex air flow sensor, as a flow sensor that detects an intake air flow rate (refer to Patent Literatures 1 to 5).

CITATION LIST

Patent Literature

Patent Literature 1: Japanese Unexamined Patent Application Publication No. H07-247895
Patent Literature 2: Japanese Unexamined Patent Application Publication No. 2001-123879
Patent Literature 3: Japanese Unexamined Patent Application Publication No. H10-220306
Patent Literature 4: Japanese Unexamined Patent Application Publication No. H02-241948
Patent Literature 5: International Publication WO2013/103018

SUMMARY OF INVENTION

Problem to be Solved by the Invention

In the meanwhile, depending on an operating region of an engine, pulsation of intake air occurs in an intake passage, causing possibility of great fluctuation of an output signal of an air flow sensor. Such great fluctuation of the output signal of the air flow sensor is a factor of a decline in calculation accuracy of an intake air flow rate by a control system that receives the output signal. Moreover, the decline in the calculation accuracy of the intake air flow rate is a factor of a decline in control accuracy of an air-fuel ratio. Thus, what is desired is to enhance the calculation accuracy of the intake air flow rate.

An object of the invention is to enhance calculation accuracy of an intake air flow rate.

Means for Solving the Problem

A vehicle control apparatus of an embodiment is a vehicle control apparatus to be provided in a vehicle. The vehicle control apparatus includes: an air flow sensor provided in an intake passage of an engine; and a control system including a processor and a memory communicatably coupled to each other. The control system is configured to read an output signal from the air flow sensor as first flow rate data. The control system is configured to calculate a coefficient of variation of the first flow rate data. The control system is configured to subject the first flow rate data to a smoothing process to calculate second flow rate data. The control system is configured to correct the second flow rate data based on the coefficient of variation to calculate corrected flow rate data. The corrected flow rate data indicates an intake air flow rate in the intake passage.

Effects of the Invention

According to an aspect of the invention, the control system calculates the coefficient of variation of the first flow rate data. The control system subjects the first flow rate data to the smoothing process to calculate the second flow rate data. The control system corrects the second flow rate data based on the coefficient of variation to calculate the corrected flow rate data. The corrected flow rate data indicates the intake air flow rate in the intake passage. Hence, it is possible to enhance calculation accuracy of the intake air flow rate.

BRIEF DESCRIPTION OF DRAWINGS

FIG. 1 is a diagram illustrating an example of a vehicle including a vehicle control apparatus according to an embodiment of the invention.

FIG. 2 is a diagram illustrating an example of an engine.

FIG. 3 is a diagram illustrating a configuration example of the vehicle control apparatus.

FIG. 4 is a diagram illustrating an example of a basic structure of an electronic control unit.

FIG. 5 is a diagram illustrating an example of an intake air flow rate to be controlled by, for example, a throttle valve.

FIG. 6 is a diagram illustrating an example of output behavior of an air flow sensor.

FIG. 7 is a diagram illustrating an example of relation between an excess air ratio and a coefficient of variation of first flow rate data.

FIG. 8 is a flowchart illustrating an example of a procedure of carrying out a data correction control.

FIG. 9 is an image diagram illustrating a state of correction of second flow rate data.

MODES FOR CARRYING OUT THE INVENTION

In the following, some embodiments of the invention are described in detail with reference to the drawings. Note that throughout the following description, the same or substantially the same configuration and element are denoted with the same reference numerals to avoid any redundant description.

[Vehicle]

FIG. 1 is a diagram illustrating an example of a vehicle 11 including a vehicle control apparatus 10 according to an embodiment of the invention. As illustrated in FIG. 1, on the vehicle 11, a power unit 14 is mounted. The power unit 14 includes an engine 12 and a transmission 13. To an output shaft 15 of the power unit 14, a rear wheel 18 is coupled through a propeller shaft 16 and a differential mechanism 17. It is to be noted that the power unit 14 in the figure is a power unit for rear wheel drive, but this is non-limiting. The power unit 14 may be a power unit for front wheel drive or all wheel drive.

[Engine]

FIG. 2 is a diagram illustrating an example of the engine 12. As illustrated in FIG. 2, the engine 12 includes a cylinder block 20 and a cylinder head 21 attached thereto. In the cylinder block 20, a crankshaft 22 is rotatably supported, and a piston 23 coupled to the crankshaft 22 is reciprocatably accommodated. Moreover, to the cylinder head 21, an intake system 25 is coupled, and an exhaust system 27 is coupled. The intake system 25 guides intake air toward an intake port 24. The exhaust system 27 guides an exhaust gas discharged from an exhaust port 26. Furthermore, to the cylinder head 21, an injector 29 is attached, and an ignition device 30 is attached. The injector 29 injects fuel into a combustion chamber 28. The ignition device 30 ignites an air-fuel mixture in the combustion chamber 28. It is to be noted that the ignition device 30 includes, for example, an igniter and a spark plug.

The intake system 25 of the engine 12 includes an air cleaner box 31, a throttle valve 32, an intake manifold 33, a tumble generator valve 34, and intake pipes 35 and 36 coupling these components together. Moreover, the exhaust system 27 of the engine 12 includes an exhaust manifold 40, a catalytic converter 41, a silencer 42, and exhaust pipes 43 and 44 coupling these components together. The intake air taken into the air cleaner box 31 is supplied to the combustion chamber 28 through the throttle valve 32, the intake manifold 33, the tumble generator valve 34, and the intake port 24. Moreover, the exhaust gas discharged from the combustion chamber 28 is discharged to the outside through the exhaust manifold 40, the catalytic converter 41, and the silencer 42.

The intake port 24 of the intake system 25 is provided with a partition plate 45 that partitions an inside of the intake port 24 into two flow paths 24*a* and 24*b*. As illustrated in FIG. 2, by closing the tumble generator valve 34, the flow path 24*a* is closed by the tumble generator valve 34. This causes the intake air flowing into the intake port 24 from the intake manifold 33 to be guided to the combustion chamber 28 through the flow path 24*b* of the intake port 24. In this way, by closing the tumble generator valve 34, it is possible to increase a flow velocity of the intake air and allow the intake air to flow along an inner wall of the combustion chamber 28. This makes it possible to generate a strong tumble flow in the combustion chamber 28 and a cylinder bore 46.

The engine 12 is provided with an EGR device 50 that supplies a portion of the exhaust gas (hereinafter, referred to as an EGR gas) to the intake system 25 from the exhaust system 27. It is to be noted that EGR is "Exhaust Gas Recirculation". The EGR device 50 includes an EGR upstream pipe 51, an EGR downstream pipe 52, and an EGR valve. The EGR upstream pipe 51 is coupled to the exhaust pipe 43 of the exhaust system 27. The EGR downstream pipe 52 is coupled to the intake manifold 33 of the intake system 25. The EGR valve 53 is provided between the EGR upstream pipe 51 and the EGR downstream pipe 52. Moreover, the EGR upstream pipe 51 is provided with an EGR cooler 54 that cools the EGR gas. When the EGR valve 53 is opened, the EGR gas is supplied to the intake system 25 from the exhaust system 27 through the EGR upstream pipe 51 and the EGR downstream pipe 52, as denoted by an arrow Ge. In the meanwhile, when the EGR valve 53 is closed, communication between the EGR upstream pipe 51 and the EGR downstream pipe 52 is shut off, resulting in a stop of the supply of the EGR gas to the intake system 25 from the exhaust system 27.

[Control System]

FIG. 3 is a diagram illustrating a configuration example of the vehicle control apparatus 10. As illustrated in FIG. 3, the vehicle control apparatus 10 is provided with a control system 61, to control the throttle valve 32, the tumble generator valve 34, the EGR device 50, the injector 29, and the ignition device 30. The control system 61 includes an electronic control unit 60. The electronic control unit 60 includes an intake air flow rate calculation unit 62, a throttle control unit 63, and an injector control unit 64. The intake air flow rate calculation unit 62 calculates an intake air flow rate flowing through the intake system 25. The throttle control unit 63 controls an opening of the throttle valve 32. The injector control unit 64 controls an amount of fuel injection of the injector 29. Moreover, the electronic control unit 60 includes an ignition control unit 65, a tumble generator control unit 66, and an EGR control unit 67. The ignition control unit 65 controls ignition timing of the ignition device 30. The tumble generator control unit 66 controls an opening of the tumble generator valve 34. The EGR control unit 67 controls an opening of the EGR valve 53.

As sensors to be coupled to the electronic control unit 60, there are a vehicle speed sensor 70, an accelerator sensor 71, a brake sensor 72, and an engine speed sensor 73. The vehicle speed sensor 70 detects a vehicle speed. The accelerator sensor 71 detects an amount of operation of an accelerator pedal. The brake sensor 72 detects an amount of operation of a brake pedal. The engine speed sensor 73 detects an engine speed. Moreover, as the sensors to be coupled to the electronic control unit 60, there are an air flow sensor 74, a front A/F sensor 75, and a rear A/F sensor 76. The air flow sensor 74 is provided in the intake pipe (intake passage) 35 and detects the intake air flow rate. The front A/F sensor 75 is provided in the exhaust pipe 43 and detects an air-fuel ratio. The rear A/F sensor 76 is provided in the exhaust pipe 44 and detects the air-fuel ratio. Furthermore, a start switch 77 is coupled to the electronic control unit 60. The start switch 77 is operated by a driver at a start-up of the control system 61.

The control units 63 to 67 of the electronic control unit 60 set respective control targets of the throttle valve 32, the tumble generator valve 34, the EGR device 50, the injector 29, and the ignition device 30 based on output signals from the respective sensors. Moreover, the control units 63 to 67 of the electronic control unit 60 output control signals set in accordance with the respective control targets, to the throttle valve 32, the tumble generator valve 34, the EGR device 50, the injector 29, and the ignition device 30. For example, the electronic control unit 60 sets a target opening of the throttle valve 32 based on the engine speed and a requested driving force, and controls the throttle valve 32 toward the target opening. Moreover, the electronic control unit 60 calculates the intake air flow rate based on the output signal from the air flow sensor 74, and controls the amount of fuel injection of the injector 29 based on the intake air flow rate. That is, the electronic control unit 60 controls the amount of fuel injection of the injector 29 based on the calculated intake air flow rate, to converge an excess air ratio $\lambda$ to a predetermined target value (for example, "1").

It is to be noted that the excess air ratio $\lambda$ is an index indicating a deviation from a stoichiometric air-fuel ratio, and is a value obtained by dividing the actual air-fuel ratio by the stoichiometric air-fuel ratio. That is, by controlling the excess air ratio $\lambda$ to "1", it is possible to obtain an air-fuel mixture of the stoichiometric air-fuel ratio, and enhance thermal efficiency of the engine 12. Moreover, an air-fuel mixture when the excess air ratio $\lambda$ is greater than "1" is a lean air-fuel mixture in which fuel is thinner than the stoichiometric air-fuel ratio. An air-fuel mixture when the excess air ratio 2 is smaller than "1" is a rich air-fuel mixture in which the fuel is thicker than the stoichiometric air-fuel ratio.

FIG. 4 is a diagram illustrating an example of a basic structure of the electronic control unit 60. As illustrated in FIG. 4, the electronic control unit 60 includes a microcontroller 82 in which, for example, a processor 80 and a main memory 81 are incorporated. A predetermined program is held in the main memory 81, and the program is executed by the processor 80. The processor 80 and the main memory 81 are communicatably coupled to each other. It is to be noted that multiple processors 80 may be incorporated in the microcontroller 82, and multiple main memories 81 may be incorporated in the microcontroller 82.

Moreover, the electronic control unit 60 is provided with, for example, an input circuit 83, a drive circuit 84, a communication circuit 85, an external memory 86, and a power supply circuit 87. The input circuit 83 converts signals inputted from various sensors, into signals suppliable to the microcontroller 82. The drive circuit 84 generates drive signals for, for example, the throttle valve 32 and the injector 29 mentioned above, based on a signal outputted from the microcontroller 82. The communication circuit 85 converts the signal outputted from the microcontroller 82 into a communication signal directed to, for example, another electronic control unit. Moreover, the communication circuit 85 converts a communication signal received from, for example, another electronic control unit, into a signal suppliable to the microcontroller 82. Furthermore, the power supply circuit 87 supplies a stable power supply voltage to, for example, the microcontroller 82, the input circuit 83, the drive circuit 84, the communication circuit 85, and the external memory 86. In addition, programs, various kinds of data, and the like are held in the external memory 86 including, for example, a nonvolatile memory.

[Calculation Error of Intake Air Flow Rate]

FIG. 5 is a diagram illustrating an example of the intake air flow rate to be controlled by, for example, the throttle valve 32. FIG. 5 illustrates first flow rate data QA00D and second flow rate data QAR, as flow rate data indicating the intake air flow rate flowing through the intake pipe 35, i.e., the intake system 25. The first flow rate data QA00D is flow rate data to be taken from the air flow sensor 74 into the intake air flow rate calculation unit 62 of the electronic control unit 60, that is, flow rate data to be taken from the air flow sensor 74 into the control system 61. Because the first flow rate data QA00D includes noises and the like, the control system 61 subjects the first flow rate data QA00D to a smoothing process, to calculate the second flow rate data QAR from the first flow rate data QA00D. It is to be noted that, as the "smoothing process" to suppress a sudden change in flow rate data, it is possible to use, for example, a simple moving average process, a weighted moving average process, or an exponential moving average process. Moreover, the smoothing process is not limited to the moving average processes, but may be, for example, a filtering process using a low-pass filter.

When the tumble generator valve 34 is closed and the EGR valve 53 is greatly opened as denoted by the time t1 in FIG. 5, or when the tumble generator valve 34 and the throttle valve 32 are greatly opened as denoted by the time t2, the first flow rate data QA00D greatly fluctuates (reference characters a1 and a2). Such a phenomenon of the fluctuation of the first flow rate data QA00D is plausibly caused by pulsation of the intake air occurring in the intake system 25. As denoted by the reference characters a1 and a2 in FIG. 5, the great fluctuation of the first flow rate data QA00D has been a factor of a decline in calculation accuracy of the intake air flow rate to be calculated based on the first flow rate data QA00D, as described later.

Here, FIG. 6 is a diagram illustrating an example of output behavior of the air flow sensor 74. As denoted by a characteristic line L1 in FIG. 6, an output voltage (output signal) of the air flow sensor 74 changes nonlinearly with respect to a change in the intake air flow rate. Accordingly, when the pulsation of the intake air in the intake system 25 causes the fluctuation of the intake air flow rate with a great amplitude Ar1, the output voltage of the air flow sensor 74 also fluctuates with a great amplitude Vo1. However, because the air flow sensor 74 has a response delay, the output voltage of the air flow sensor 74 has fluctuated with an amplitude Vo2 smaller than the amplitude Vo1. Moreover, the control system 61 determines that the intake air flow rate fluctuates with an amplitude Ar2 based on the output voltage of the amplitude Vo2 reduced by the response delay. In other words, the control system 61 should have determined the intake air flow rate as "FL1" that is the median of the amplitude Ar1, but there is possibility that the control system 61 may undercalculate the intake air flow rate as "FL2" that is the median of the amplitude Ar2. That is, when the first flow rate data QA00D has greatly fluctuated, there is possibility that, as indicated by an arrow x1, the intake air flow rate is undercalculated by the control system 61 as being smaller than is actual.

FIG. 7 is a diagram illustrating an example of relation between the excess air ratio 2 and a coefficient of variation CoV of the first flow rate data QA00D. FIG. 7 illustrates, by a broken line, the excess air ratio λ when the engine speed is maintained at 1200 [rpm], illustrates, by a long dashed short dashed line, the excess air ratio λ when the engine speed is maintained at 1600 [rpm], and illustrates, by a solid line, the excess air ratio λ when the engine speed is maintained at 2000 [rpm]. It is to be noted that the coefficient of variation CoV of the first flow rate data QA00D is an index indicating a degree of variation in the first flow rate data QA00D, and is a value obtained by calculating a standard deviation and an average value from multiple pieces of the first flow rate data QA00D and dividing the standard deviation by the average value.

As illustrated in FIG. 7, a situation that the coefficient of variation CoV of the first flow rate data QA00D becomes greater is a situation that the variation in the first flow rate data QA00D enlarges, and is a situation that the first flow rate data QA00D greatly fluctuates because of the pulsation of the intake air. As described, when the first flow rate data QA00D greatly fluctuates, the intake air flow rate is undercalculated as being smaller than is actual. Accordingly, it is difficult to appropriately control the amount of fuel injection of the injector 29. That is, it is difficult to control the excess air ratio λ to the target value. In other words, in the situation where the coefficient of variation CoV of the first flow rate data QA00D becomes greater, the intake air flow rate is undercalculated as being smaller than is actual. Accordingly, even when the excess air ratio λ is controlled toward "1" as the target value, the excess air ratio 2 shifts lean-wise as indicated by reference characters b1, resulting in difficulty in converging the excess air ratio λ to the target value.

[Data Correction Control]

As described, depending on an operating situation of the engine 12, the pulsation of the intake air occurs in the intake system 25, causing the great fluctuation of the first flow rate data QA00D. Moreover, when the first flow rate data QA00D greatly fluctuates, the intake air flow rate based on the second flow rate data QAR becomes smaller than an actual intake air flow rate. Accordingly, it is difficult to appropriately control the excess air ratio λ toward the target value. Thus, the control system 61 carries out a data correction control described below, to correct the second flow rate data QAR to enhance the calculation accuracy of the intake air flow rate.

In the following, description is given of a state of carrying out the data correction control by the control system 61. FIG. 8 is a flowchart illustrating an example of a procedure of carrying out the data correction control. Moreover, each step of the data correction control illustrated in FIG. 8 illustrates a process to be carried out by the processor 80 constituting the control system 61. Furthermore, the data correction control illustrated in FIG. 8 is a control to be carried out by the control system 61 in predetermined cycles after the start-up of the control system 61.

As illustrated in FIG. 8, in step S10, the output voltage from the air flow sensor 74 is read by the control system 61 as the first flow rate data QA00D. In step S11, the standard deviation SD and the average value Ave are calculated from the multiple pieces of the first flow rate data QA00D. In subsequent step S12, as given in the following Expression (1), the standard deviation SD is divided by the average value Ave, to calculate the coefficient of variation CoV of the first flow rate data QA00D. It is to be noted that, in calculating the coefficient of variation CoV of the first flow rate data QA00D, the multiple pieces of the first flow rate data QA00D read over the most recent predetermined period of time are used.

$$CoV = SD / Ave \tag{1}$$

In step S13, a coefficient of correction k1 is calculated from the coefficient of variation CoV based on the following Expression (2). Next, the flow proceeds to step S14, and the first flow rate data QA00D is subjected to the smoothing process such as the moving average processes, to calculate the second flow rate data QAR from the first flow rate data QA00D. In subsequent step S15, as given in the following Expression (3), the second flow rate data QAR is multiplied by the coefficient of correction k1, to calculate corrected flow rate data C_QAR indicating the intake air flow rate. It is to be noted that constants a and b included in Expression (2) are constants set by experiment, simulation, or the like.

$$k1 = a \times CoV + b \tag{2}$$

$$\mathrm{C\_QAR} = QAR \times k1 \tag{3}$$

Here, FIG. 9 is an image diagram illustrating a state of correction of the second flow rate data QAR. It is to be noted that FIG. 9 illustrates the second flow rate data QAR and the corrected flow rate data C_QAR when the actual intake air flow rate is "FL10". As illustrated in FIG. 9, when the coefficient of variation CoV of the first flow rate data QA00D becomes greater, the intake air flow rate indicated by the second flow rate data QAR becomes smaller than the actual "FL10". However, by multiplying the second flow rate data QAR by the coefficient of correction k1, as indicated by an arrow c1, the intake air flow rate indicated by the correction flow rate data C_QAR is brought closer to the actual "FL10". That is, as the coefficient of variation CoV of the first flow rate data QA00D becomes greater, the corrected flow rate data C_QAR is calculated increase-wise of the intake air flow rate.

As described, the coefficient of variation CoV is calculated from the multiple pieces of the first flow rate data QA00D, and the second flow rate data QAR is corrected based on the coefficient of variation CoV. Thus, the corrected flow rate data C_QAR is calculated from the second flow rate data QAR. Moreover, for example, the amount of fuel injection of the injector 29 is controlled based on the intake air flow rate obtained from the corrected flow rate data C_QAR. Hence, it is possible to accurately calculate the intake air flow rate flowing through the intake system 25, and appropriately control, for example, the excess air ratio 2.

The invention is not limited to the forgoing embodiments, but it should be appreciated that various modifications may be made without departing from the subject matter of the invention. For example, in the forgoing description, the control system 61 includes the single electronic control unit 60, but this is non-limiting. The control system 61 may include multiple electronic control units. Moreover, the air flow sensor 74 in the figure is a hot wire air flow sensor, but this is non-limiting. The air flow sensor 74 may be, for example, a Karman vortex air flow sensor. Furthermore, the engine 12 in the figure is a gasoline engine using gasoline as fuel, but this is non-limiting. The engine 12 may be an engine such as a diesel engine using fuel other than gasoline.

In addition, the number of samples of the first flow rate data QA00D to be used in calculating the coefficient of variation CoV may be the preset number of samples, or may be the number of samples that varies with the situation. For example, in the situation that the first flow rate data QA00D and the second flow rate data QAR rapidly change, responsiveness of the coefficient of variation CoV may be enhanced by reducing the number of samples of the first flow rate data QA00D. Moreover, in the situation that the first flow rate data QA00D and the second flow rate data QAR gradually change, the calculation accuracy of the coefficient of variation CoV may be enhanced by increasing the number of samples of the first flow rate data QA00D.

DESCRIPTION OF REFERENCE NUMERALS

10: Vehicle control apparatus
11: Vehicle
12: Engine
35: Intake pipe (intake passage)
61: Control system
74: Air flow sensor
80: Processor
81: Main memory (memory)
QA00D: First flow rate data
QAR: Second flow rate data
C_QAR: Corrected flow rate data
CoV: Coefficient of variation
SD: Standard deviation
Ave: Average value
k1: Coefficient of correction

The invention claimed is:

1. A vehicle control apparatus to be provided in a vehicle, the vehicle control apparatus comprising:

an air flow sensor provided in an intake passage of an engine, wherein the air flow sensor is configured to generate an output signal representing an intake air flow rate in the intake passage; and a control system comprising a processor and a memory communicatably coupled to each other, wherein the control system is configured to:

receive the output signal from the air flow sensor as first flow rate data;

calculate a standard deviation and an average value from multiple pieces of the first flow rate data, and divides the standard deviation by the average value to calculate a coefficient of variation of the first flow rate data;

apply a smoothing process to the first flow rate to calculate second flow rate data;

correct the second flow rate data based on the coefficient of variation of the first flow rate data to calculate corrected flow rate data, the corrected flow rate data providing a more accurate representation of the intake air flow rate in the intake passage compared to the intake air flow rate represented in the output signal of the air flow sensor; and control an amount of fuel injection of an injector of the engine using the corrected flow rate data.

2. The vehicle control apparatus according to claim 1, wherein the control system is configured to calculate the corrected flow rate data increase-wise of the intake air flow rate, as the coefficient of variation becomes greater.

3. A vehicle control apparatus to be provided in a vehicle, the vehicle control apparatus comprising:

an air flow sensor provided in an intake passage of an engine, the air flow sensor configured to generate an output signal representing an intake air flow rate in the intake passage; and a control system comprising a processor and a memory communicatably coupled to each other, wherein the control system is configured to:

receive the output signal from the air flow sensor as first flow rate data;

calculate a coefficient of variation of the first flow rate data;

apply a smoothing process to the first flow rate to calculate second flow rate data;

calculate a coefficient of correction based on the coefficient of variation, and multiply the second flow rate data by the coefficient of correction to calculate corrected flow rate data, the corrected flow rate data providing a more accurate representation of the intake air flow rate in the intake passage compared to the intake air flow rate represented in the output signal of the air flow sensor; and control an amount of fuel injection of an injector of the engine using the corrected flow rate data.

4. The vehicle control apparatus according to claim 1, wherein the output signal of the air flow sensor changes nonlinearly with respect to a change in the intake air flow rate.

* * * * *